United States Patent [19]

Shires

[11] Patent Number: 5,269,015
[45] Date of Patent: Dec. 7, 1993

[54] COMPUTER SYSTEM INCLUDING CIRCUITRY FOR READING WRITE-ONLY OUTPUT PORTS

[75] Inventor: Glen E. Shires, Santa Clara, Calif.

[73] Assignee: Lucid Corporation, Tex.

[21] Appl. No.: 960,252

[22] Filed: Oct. 13, 1992

Related U.S. Application Data

[63] Continuation of Ser. No. 435,152, Nov. 13, 1989, abandoned.

[51] Int. Cl.⁵ .............................................. G06F 13/00
[52] U.S. Cl. ............................ 395/425; 364/DIG. 1; 365/230.05
[58] Field of Search ....................................... 395/425; 364/200 MS File, 900 MS File; 365/189.04, 230.05

[56] References Cited

U.S. PATENT DOCUMENTS 4,349,870 9/1982 Shaw et al. .......................... 395/800
4,642,794 2/1987 Lavelle et al. ........................ 340/726

Primary Examiner—Glenn Gossage
Attorney, Agent, or Firm—Timmons & Kelly

[57] ABSTRACT

A computer system includes a processor and bus logic, a decode logic circuit for the processor and bus logic access, a memory subsystem and at least one output port. Writes by the processor and bus logic to an output port also update corresponding location in memory through the decode logic. In one arrangement, a logical "OR" gate enables the memory in response to an output of the decode logic for activating the memory subsystem or an output of the decode logic for activating the output port.

2 Claims, 2 Drawing Sheets

COMPUTER SYSTEM INCLUDING CIRCUITRY FOR READING WRITE-ONLY OUTPUT PORTS

This application is a continuation of application Ser. No. 07/435,152, filed Nov. 13, 1989, now abandoned.

TECHNICAL FIELD

This invention relates generally to methods and apparatus for accessing output ports in computer systems. Traditionally, output ports are either write-only, that is their contents may not be read by the processor, or extra logic is used to allow the port to be read by the processor. The present invention allows output ports to be read without the use of such additional logic.

BACKGROUND ART

It is common in computer systems to have one or more output ports that control other devices. A few examples of such devices are indicator lights, video displays, speakers, and disks, as well as devices that control the computer system itself such as timers and interrupt controllers. Often, the processor needs to know the current setting of these output ports. Prior art includes two different mechanisms to provide this function, either by adding extra logic to make the output port readable by the processor, or by requiring the processor software to maintain its own independent copy of the current setting in the computer memory.

Referring now to FIG. 1, a typical computer system is referred to generally by reference numeral 10. Computer system 10 includes a processor and bus control logic 12 and a memory 14 which allows the processor to read and write a variety of stored information. An output port 16 allows the processor to control an output device 18. At least one input port 20 allows the processor to read the current setting of the output port. Other input ports 22 may be included to read information from input devices 24, such as a keyboard or timer. Decode logic 26 is used to translate the processor and bus logic ADDRESS into the chip-selects required to activate the memory and ports when the processor requests them. The decode logic maps the ports either to the processor's memory or to Input/output addresses. Finally, the processor and bus logic produces READ and WRITE signals to activate the memory and ports during processor read and write accesses respectively.

Computer systems with this design allow output port 16 to be read by the processor through input port 20, but extra logic is required to implement this input port, which requires more components and more physical space, or more complex components, and in either case more cost.

The other prior art mechanism used in some computer systems avoids this cost by leaving out input port logic 20 and relying on the software to maintain the setting of output port 16 by performing additional accesses to store and recall the setting from memory 14. This reduces the cost of the logic, but increases the execution time and memory space required by the software. Furthermore, this can complicate or even make it impossible for loosely coupled software programs to interact with the hardware because it may be difficult or impossible for one program to know the state in which another program has set the output port.

DISCLOSURE OF INVENTION

The present invention eliminates both the additional input port and the necessity for software to maintain the setting of the output port in memory. A modification to the decode logic allows writes to the output port to automatically also write to the memory, and reads from the location typically used by the input port to recall the output port setting from the memory. Thus, from the software's point of view, there is an input port from which the output setting can be read, but the logic is reduced because no input port is actually required.

The extra software overhead to maintain the setting in memory is eliminated and the ability to easily run loosely coupled software programs is preserved. The logic for the input port is also eliminated, which reduces the number of components and the physical space required and/or the complexity of the components, and reduces cost.

These and other objects, advantages and features of this invention will be apparent from the following description taken with reference to the accompanying drawing, wherein is shown the preferred embodiments of the invention.

DESCRIPTION OF THE PREFERRED EMBODIMENTS

Figure 1:
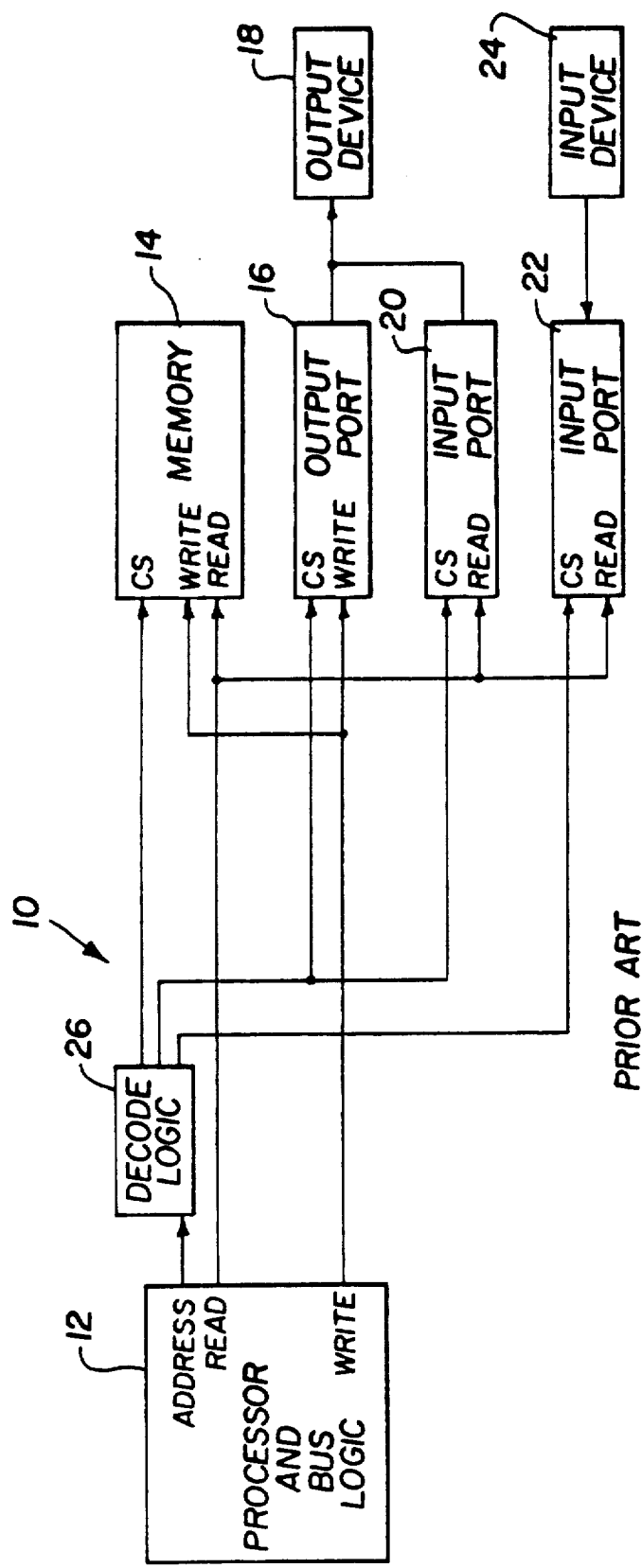
FIG. 1 is a block diagram representation of a typical computer system of the prior art.
Figure 2:
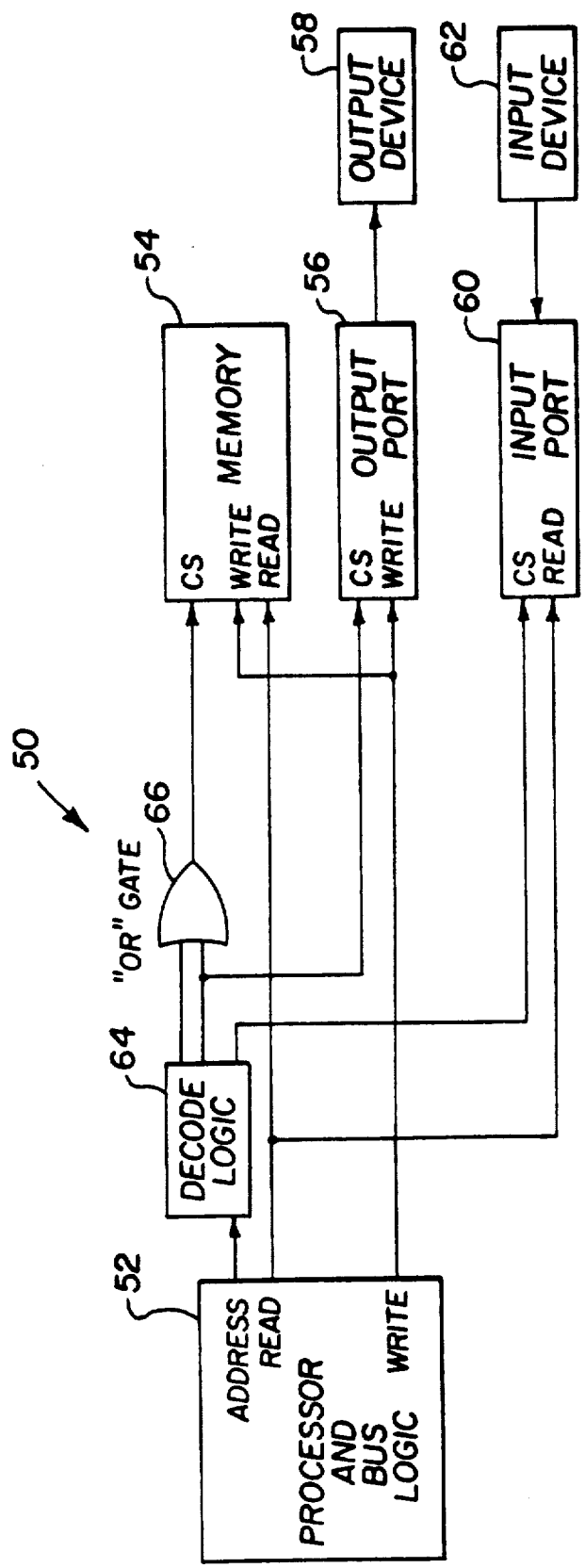
FIG. 2 is a block diagram representation of a computer system according to the present invention.

Referring now to FIG. 2, a computer system according to the current invention is referred to generally by reference numeral 50. Computer 50 includes a processor and bus control logic 52 and a memory 54 which allows the processor to read and write a variety of stored information. Output port 56 allows the processor to control output devices 58. Other input ports 60 may be included to read information from input devices 62. Decode logic 64 is used to translate the processor and bus logic ADDRESS into the chip-selects required to activate the memory and ports when the processor requests them. The decode logic maps the ports either to the processor's memory or to Input/Output addresses. "OR" gate 66 is provided so that memory 54 is activated both for writes to memory and for writes to output port 56. The memory, however, is not activated for requests from input port 60 which is connected to input devices. In some embodiments this gate may be combined into decode logic 64. Finally, the processor and bus logic produces READ and WRITE signals to activate the memory and ports during processor read and write accesses respectively.

Computer systems according to a preferred embodiment make write accesses directed to output port 56 which will also write to a corresponding memory 54 location. Computer systems according to a preferred embodiment allow output port 56 to be read by the processor through an access identical to one which would be used if an input port was used to read the output port setting. In the preferred embodiment, such an access actually reads the setting from the location it has stored in the memory. However, processor accesses to input port 60, which is actually connected to an input device, read from the input port directly.

In a preferred embodiment, there are many more memory locations than output ports. Therefore, only certain memory locations are used to store output port settings, and the remainder of the memory locations can be used for traditional memory storage purposes.

In a preferred embodiment, the memory location used to store the output port setting corresponds to an alias of the memory or Input/Output address used by the processor to access the output port. This eliminates the need for any logic to translate the address to the memory differently for port accesses and accesses directly to the memory.

In a preferred embodiment, aliases of the output port may map to more than one memory location giving the software the option of saving several different settings in memory to, for example, implement several levels of tasks and automatically maintain each setting in memory.

Another embodiment does not enable the memory on read accesses of the ports, but still performs the write accesses to the memory whenever the output ports are written to. In this case, the decode logic may be slightly simplified to save cost, and the output port setting can be read by the processor through a memory access.

In either embodiment, the minimum amount of memory used to store the output port settings is no more than the amount that is used in the prior art method of eliminating the input port and relying on the software to maintain the setting in memory.

It is now clear to see that the present invention has several advantages over the methods and apparatus for accessing output ports of the prior art. The present invention eliminates the extra software overhead to maintain the setting in memory and preserves the ability to easily run loosely coupled software programs. The logic for the input port is eliminated, which reduces the number of components and the physical space required and/or the complexity of the components, and reduces cost.

It is easy to see that the present invention provides an extremely efficient method for reading the settings of write-only output ports and is one well adapted for use on accelerator boards as well as in other computer systems and subsystems.

From the foregoing, it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

I claim:

1. A computer system comprising in combination:
   a processor and bus logic having an address output, a read control output and a write control output;
   a decode logic for translating the processor and bus logic address output into a plurality of select signals;
   at least one memory subsystem, wherein the decode logic provides, as one of said select signals, a first output for activating the at least one memory subsystem;
   at least one output port, wherein the decode logic provides, as one of said select signals, a second output for activation the at least one output port; and
   a logical "OR" gate having inputs coupled to the first output and the second output, said OR gate having an output connected to a select input of said memory subsystem, wherein writes by said processor and bus logic to the at least one output port are also written to an addressed location in the memory subsystem, whereby a setting of the at least one output port is maintained in the memory subsystem.

2. A computer system comprising in combination:
   a processor and bus logic having an address output, a read control output and a write control output;
   a decode logic for translating the processor and bus logic address output into a plurality of select signals;
   at least one memory subsystem, wherein the decode logic provides, as one of said select signals, a first output for activating the at least one memory subsystem;
   at least one output port, wherein the decode logic provides, as one of said select signals, a second output for activating the at least one output port; and
   a circuit having inputs coupled to the first output and the second output, said circuit having an output coupled to a select input of said memory subsystem, wherein writes by said processor and bus logic to the at least one output port are also written to an addressed location in the memory subsystem, whereby a setting of the at least one output port is maintained in the memory subsystem.

* * * * *